No. 774,571. PATENTED NOV. 8, 1904.
G. W. DY ARMAN.
MACHINE FOR MOLDING ARTIFICIAL STONE.
APPLICATION FILED JAN. 11, 1904.
NO MODEL. 2 SHEETS—SHEET 1.

Witnesses:
Don W. Voorhies.
Stella Snider.

Inventor:
George W. Dy Arman.
By E. T. Silvius,
Attorney.

No. 774,571. PATENTED NOV. 8, 1904.
G. W. DY ARMAN.
MACHINE FOR MOLDING ARTIFICIAL STONE.
APPLICATION FILED JAN. 11, 1904.
NO MODEL. 2 SHEETS—SHEET 2.
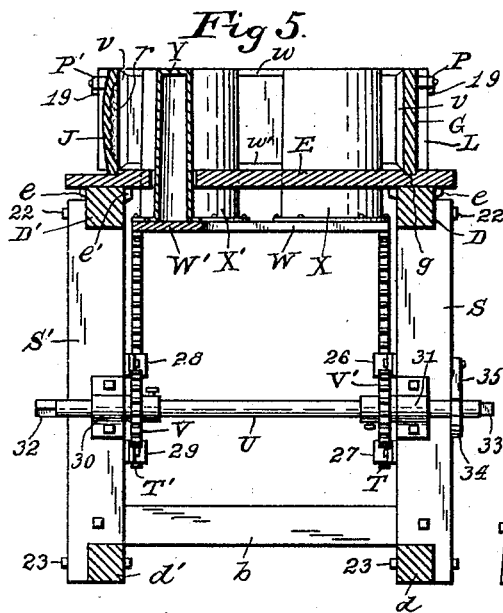
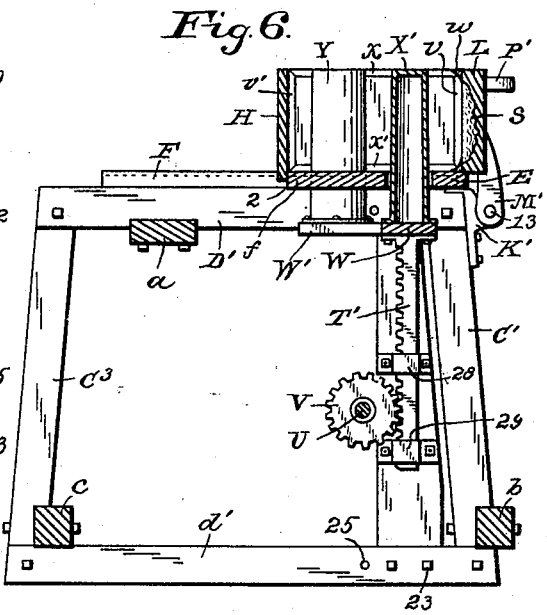
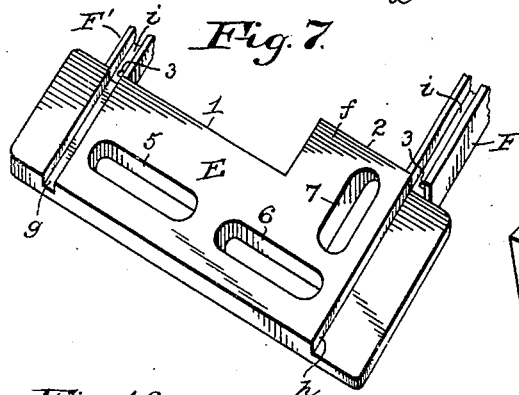
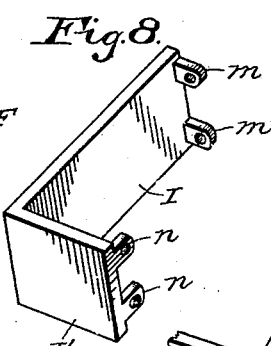
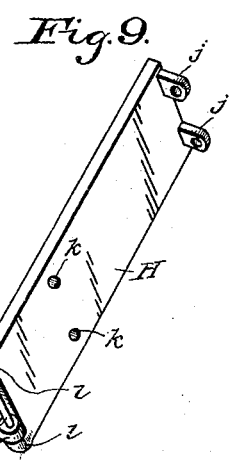
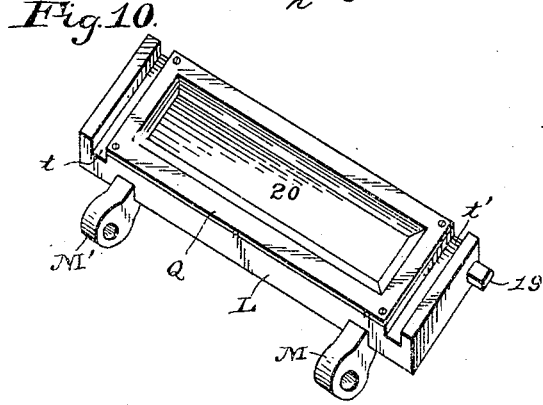
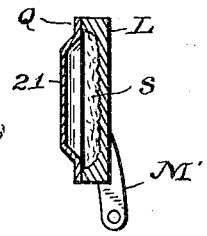
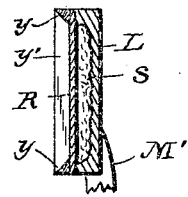
Witnesses:
Dow W. Voorhies.
Stella Snider.
Inventor:
George W. Dy Arman,
By E. T. Silvius,
Attorney.

No. 774,571. Patented November 8, 1904.

UNITED STATES PATENT OFFICE.

GEORGE W. DY ARMAN, OF INDIANAPOLIS, INDIANA, ASSIGNOR OF ONE-HALF TO JOHN WHITAKER, OF COLUMBUS, OHIO.

MACHINE FOR MOLDING ARTIFICIAL STONE.

SPECIFICATION forming part of Letters Patent No. 774,571, dated November 8, 1904.

Application filed January 11, 1904. Serial No. 188,649. (No model.)

*To all whom it may concern:*

Be it known that I, GEORGE W. DY ARMAN, a citizen of the United States, residing at Indianapolis, in the county of Marion and State of Indiana, have invented new and useful Improvements in Machines for Molding Artificial Stones; and I do declare the following to be a full, clear, and exact description of the invention, reference being had to the accompanying drawings, and to the letters and figures of reference marked thereon, which form a part of this specification.

This invention relates to molding-machines that are designed to be employed in the manufacture or production of artificial stones for building and other purposes; and the invention has reference particularly to the molds and also to the core-supports and the apparatus for controlling and operating the cores which are employed for molding hollow stones.

The object of the invention is to provide an inexpensive molding-machine whereby stones of various shapes and styles may be molded with little trouble in changing the forms of molds for the various patterns of stones.

With the above-mentioned object in view the invention consists in certain improved forms of molds and in improved apparatus for controlling and operating the cores for hollow stones; and the invention consists also in the novel parts and the combination and arrangement of parts, as hereinafter particularly described and claimed.

Figure 1:
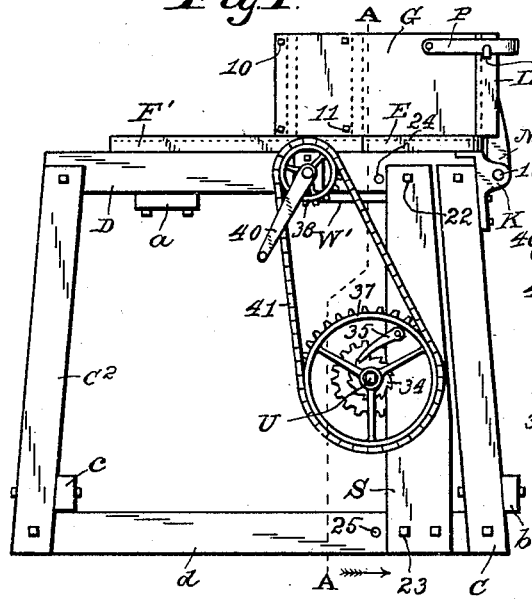
Figure 2:
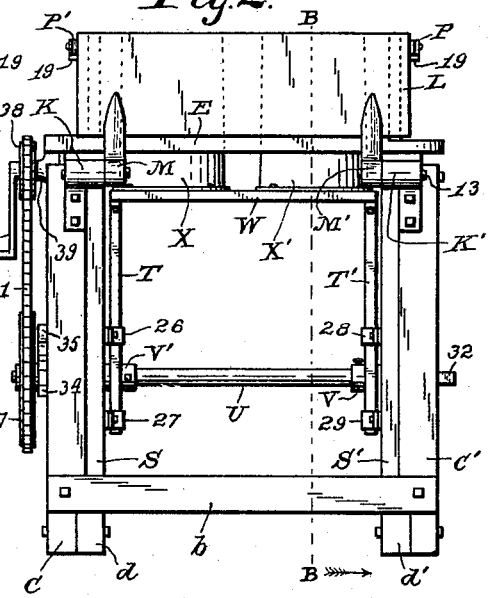
Figure 3:
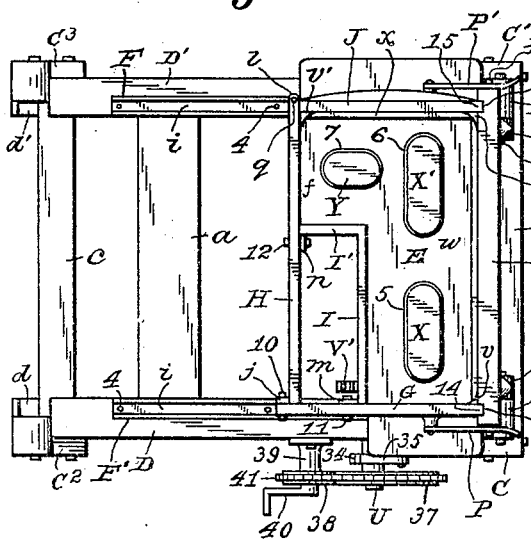
Figure 4:
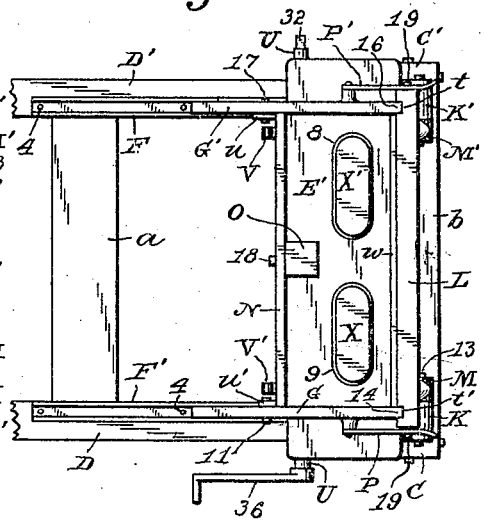

Referring to the drawings, Figure 1 is a side elevation of a machine constructed substantially in accordance with the invention; Fig. 2, a front elevation thereof; Fig. 3, a top plan of the machine as illustrated in Figs. 1 and 2, having the mold adapted for making hollow corner-stones; Fig. 4, a fragmentary top plan of the machine modified as to the mold, so as to adapt it for making hollow plain or line stones having recesses to receive floor-joists; Fig. 5, a transverse vertical sectional view at the planes of the line A A in Fig. 1; Fig. 6, a longitudinal vertical sectional view at the plane of the line B B in Fig. 2; Fig. 7, a perspective view of the mold-bottom for hollow corner-stones and portions of guides for the mold ends; Fig. 8, a perspective view of a part of the mold-back for corner-stones; Fig. 9, a perspective view of a part of the mold-back for corner-stones and a fragment of a swinging mold end for corner-stones connected thereto; Fig. 10, a perspective view of a swinging mold-front having a removable face-plate attached thereto; Fig. 11, a transverse vertical sectional view of the swinging mold-front having the face-plate applied thereto in reversed order; and Fig. 12 is a detail view similar to that in Fig. 11, showing a modified form of face-plate applied to the mold-front.

Similar reference characters in the several figures of the drawings indicate like parts or features.

In construction a supporting-frame is provided comprising four corner-posts $C C' C^2 C^3$, suitably connected together, upon which is secured a horizontal frame comprising side members D D' and a tie-beam $a$. A tie-bar $b$ connects the two front corner-posts C C', and a tie-bar $c$ connects the other two or rear corner-posts at the lower portions thereof. A pair of parallel bars $d d'$ are attached to the lower portions of the corner-posts, each one of the bars to a pair of the posts and parallel to the members D D'.

The metallic mold-bottoms may be variously shaped to suit different styles of stones. For making corner-stones a mold-bottom E is employed which rests securely on the side members D D' and may be suitably keyed thereto, as by projections $e e'$, attached to the under side of the bottom E, so as to engage the side members, or other suitable forms of keys may be employed, so that the bottom E may be detached and removed when desired. The bottom E has a rearward projection $f$, extending from one end thereof, rendering this end of the bottom broader than the opposite end thereof, the rear edge 1 of the body portion of the bottom and the rear edge 2 of the projection being in parallel planes. In the upper face of the narrower end portion of the bottom E is a transverse groove $g$, providing a guide and gage for one of the mold ends required. A part of the broader end of the bottom E has less height than the remainder of the member, so that a shoulder $h$ is formed, providing a guide and gage for the other mold end parallel to the groove $g$. The horizontal frame is provided with a pair of parallel guide-bars F F', having ends abutting the bottom E, the guides having each a groove $i$ in the top thereof and provided with screw-holes 3, whereby screws 4 secure the guide-bars to the members D D', the grooves $i$ being in alinement with the mold-end guides in the top of the mold-bottom. When it is designed to make hollow stones, the mold-bottom E has apertures 5 6 7 in the body and projecting portions thereof through which cores may extend from below; but these apertures will not be provided when molding solid stones.

A mold end G is placed movably in the groove $g$ on the bottom E and extends beyond the same into the groove $i$ of the guide-bar F' and also across the narrower end of the bottom E for forming the narrower end of a corner-stone.

A metallic back H, having ears $j$ at one end thereof, is secured detachably to the rear end of the end G by means of bolts 10 and extends against the rear edge 2 of the projection $f$ beyond the end thereof, the opposite or free end of the back H having ears $l$ for pivoting a suitable mold end thereto. A corner mold-back I, having a right-angle wing I', is provided with ears $m$, whereby the back I is detachably connected by bolts 11 to the mold end G, so as to bear against the edge 1 of the bottom E, the wing having ears $n$, whereby the wing is attached to the back H by bolts 12, extending through holes $k$ in the back H. The back I and its wing I' are to form the backs of right-angled corner-stones.

A suitable metallic swinging mold end J for corners having ears $p$ is connected thereby to the ears $l$ by means of a pivot-pin $q$, the end J being gaged by the shoulder $h$ and may slide in the guide-bar F; but normally it extends across the bottom E and its projection $f$ being designed to swing horizontally when being released from a stone.

Brackets K K' are attached to the front of the horizontal frame and the forward frame-posts C C' for supporting the mold-front L, which has ears M M' connected to the brackets by pivot-pins 13, so that the mold-front may swing vertically away freely from the molded stone. The inner face of the front L has recesses $t\ t'$ at the ends thereof to receive the ends 14 and 15 of the mold ends.

When the machine is adapted to mold line-stones, the bottom E' without a projection $f$ is employed, the mold-bottom being of uniform width throughout and if the stones are to be hollow the mold-bottom will have apertures 8 and 9 to clear the cores required. In this modification a mold end G' similar to the end G, but reversed in shape, is arranged oppositely to the end G in lieu of the swinging end J, extending from the bottom E' onto the guide-bar F, the bottom E' having a suitable guide and gage for the end G', preferably like the groove $g$, in alinement with the groove $i$ of the guide-bar. The recesses $t\ t'$ will receive the ends 14 and 16 of the mold ends, whereby the mold ends will be maintained in vertical positions while tamping the concrete mass for the stones. A mold-back N, having ears $u'$, extends from the end G at the rear of the bottom E' and is secured detachably to the end G by means of the ears and the bolts 11, the back N also having ears $u$ at its opposite end by which it is connected to the end G' by bolts 17. A projection O is secured by a bolt 18 to the inner side of the back N to form recesses in the stones into which floor-joists may extend.

It will thus be seen that the mold backs and ends are connected together and may slide together to and from the mold-front. The mold end G is provided with a pivoted latch P, and the ends G' and J are provided each with a similar latch P', the latches being adapted to engage catches 19 at the ends of the mold-front L to hold the mold-front to the mold ends while tamping the concrete.

The swinging mold end J has a recessed and roughened inner side $r$, designed to form imitations of rock faces or rough cut faces on the molded stones. The swinging front L has a similarly-formed inner side $s$.

The front L is provided with a detachable plate Q at the inner side thereof which may be employed when desired to change the style of stone face, and the plate may have any suitable figure, either raised or sunken, or the plate may be a plane, the plate Q shown having a sunken panel 20 in Fig. 10, and in Fig. 11 the plate is reversed, so as to form a raised panel 21 on the mold-front. The mold end J may obviously be likewise provided with a similar plate for the same purpose.

The mold-front L is provided in Figs. 3, 5, and 6 with vertical forms $v$ at the ends thereof adjacent to the mold ends whereby to mold beveled-edge stones, and for the same purpose it also has horizontal forms $w\ w'$ at the top and bottom thereof. The mold end J is provided with a vertical form $v'$, adjacent to the back H, and also with horizontal forms $x\ x'$ at the top and bottom thereof for molding beveled-edge stones, the said forms being suitably adapted to be removed when desired. When smooth-face stones with beveled edges are desired, a plain plate R is attached to the mold-front L, provided with edge-forms $y\ y'$, as in Fig. 12, and a similar plate may obviously be attached to the end J to conform to the style of the mold-front.

In order to adjustably support the cores that are provided and required for making hollow stones when desired, a pair of upright parallel posts S S' are adjustably attached at their ends to the parallel bars $d\ d'$ and also to the side members D D' by means of bolts 22 and 23, suitable holes 24 and 25 being provided which serve also as gages, the posts being situated near the forward corner-posts C C' and adapted to be shifted forwardly and rearwardly, so that the positions of the cores in the stones may be changed with respect to the front faces of the stones, suitable mold-bottoms of course being provided with core-apertures in different places, as may be required. The inner sides of the posts S S' are each provided with a pair of guides, as 26 and 27 and 28 and 29, and in a horizontal plane between the upper and lower guides of the pairs a pair of journal-boxes 30 and 31 are secured to the posts S S' at the rear sides thereof, a pair of upright rack-bars T T' being arranged in the said guides. A rotative shaft U is mounted in the journal-boxes 30 and 31 and has squared ends 32 and 33. A ratchet-wheel 34 is secured to the shaft U and is engaged by a pawl 35, pivoted to the post S. A suitable hand-crank 36 is provided for operating the shaft U; but in some cases the crank may not be employed, being detechably connected to an end of the shaft. A pair of pinions V V' are secured to the shaft U in engagement with the rack-bars T T' for operating the cores, as well as supporting them in coöperation with the other devices. A table W, having a projection W', is secured to the upper ends of the rack-bars T T', and on the top of the table the required number of cores, as X X' Y, are attached thereto, the cores when in use extending through the apertures in the mold-bottom provided therefor to the plane of the tops of the mold front, back, and ends. The range of vertical movement of the cores is such that they may be depressed until their tops fall below the plane of the bottom of the mold-bottom. It will be seen that the core Y is situated partially on the projection W' in range of the aperture 7, and it may be detached when not required in case the mold-bottom E' is employed.

The shaft U, as shown in Figs. 1, 2, and 3, is provided with a sprocket-wheel 37, secured to an end thereof, and a sprocket-wheel 38 is mounted on a bracket 39, that is secured to the member D, the wheel 38 being provided with a hand-crank 40, and a chain belt 41 connects the two sprocket-wheels 37 and 38, so that the cores may be operated without requiring the operator to assume stooping positions and also so that increased power may be applied to the shaft U beyond what might be applied directly by the crank 36, if used. With the maximum power attained by the gearing also more perfect control may be had over the cores in withdrawing them from the molded stones, so that the cores need not have excessive draft clearance, The gearing, however, may in some cases be dispensed with.

It will be understood that in order to mold various shapes and types of stones the only changes required will be with respect to the mold-bottoms, one of the cores, one mold end, the guide-bar F, the mold-back, and the plates and forms on the mold-front and the swinging mold end. The guide-bar F may be moved forward or back, as may be required with the different mold-bottoms.

In practical use the machine having been arranged either for making corner-stones or line-stones, as described, with the cores run up, if used, and latched by the pawl 35, the concrete mass may be filled in the mold, and when the mass is sufficiently set the cores may be withdrawn downwardly by means of the crank 36 or the crank 40 and connected gearing, if provided. Then the latches P P' should be released from the mold-front L, which may then swing outwardly and downwardly, the same being accomplished by the operator, who may take hold of the ends of the mold-front. Now if the end J be employed it may be moved radially from the stone, and then the connected mold backs and ends may be moved rearwardly on the guide-bars F F' free from the stone, which may then be removed from the mold-bottom E. In case the end G' be used with the bottom E' it will be moved, together with the end G and back N, onto the guide-bars.

Having thus described the invention, what I claim as new is—

1. A molding-machine including a mold-bottom, a vertically-swinging mold-front, a pair of mold ends mounted slidingly on the mold-bottom, and a mold-back attached to the mold ends.

2. A molding-machine including a frame, a mold-bottom on the frame, a swinging mold-front, guide-bars on the frame abutting the mold-bottom, a pair of mold ends mounted slidingly on the mold-bottom and the guide-bars, and a mold-back supported by the pair of mold ends.

3. A molding-machine including a frame, a mold on the frame comprising a bottom, a swinging front having recesses therein, and a back and a pair of ends connected together and movable horizontally on the bottom, the pair of ends entering the recesses in the front, and guides and gages for the ends and the back.

4. A molding-machine including a frame, a mold on the frame comprising a bottom, a swinging front, a pair of ends and a back connected together and slidingly supported, one of the ends being pivoted to the back so as to also move radially, means for interlocking the pivoted end and the swinging front, and guides and gages for the ends and the back.

5. A molding-machine including a frame having a pair of brackets, a mold-bottom mounted removably on the frame adjacently to the brackets, a mold-front pivoted to the brackets, mold ends mounted slidingly on the mold-bottom, a mold-back supported by the mold ends, guide-bars on the frame to receive the mold ends from the mold-bottom, and latches coöperating with the mold ends and the mold-front.

6. In a molding-machine, the combination of a mold-bottom having guides at the top thereof, mold ends mounted slidingly in the guides of the bottom, a mold-back attached to the mold ends, a swinging mold-front having recesses therein to receive edges of the mold ends, and a reversible face-plate attached to the swinging mold-front between the recesses thereof.

7. In a molding-machine, the combination of a mold-bottom having guides at the top thereof, mold ends slidingly mounted in the guides of the bottom, guide-bars in alinement with the guides of the bottom, a mold-back attached to the mold ends, and a swinging mold-front having bevel forms at the edges of the inner face thereof.

8. In a molding-machine, the combination of a mold-bottom, a swinging mold-front, a pair of sliding mold ends, a mold-back attached to the mold ends, and a corner mold-back secured to the mold-back and also to one of the mold ends.

9. In a molding-machine, the combination of a mold-bottom, a mold end and a mold-back rigidly connected together, a mold end pivoted to the mold-back and having bevel forms at edges of the inner face thereof, guides for the mold ends, and a vertically-swinging mold-front having bevel forms at the edges of the inner face thereof.

10. In a molding-machine, the combination of a frame, a pair of opposing upright posts adjustably attached at the upper and lower ends thereof to the frame, an apertured mold-bottom detachably mounted on the frame, gearing supported by said posts, cores supported and controlled by the gearing, a swinging mold-front, mold ends coöperating with the mold-front, and a mold-back connected to the mold ends and movable therewith horizontally on the mold-bottom to and from the mold-front.

11. In a molding-machine, the combination of a mold-bottom having guides at the top thereof, mold ends in the guides, a swinging mold-front, a mold-back attached to the mold ends, and a projection at the inner side of said mold-back.

In testimony whereof I affix my signature in presence of two witnesses.

GEORGE W. DY ARMAN.

Witnesses:
  Wm. H. Payne,
  E. T. Silvius.